Patented June 11, 1935

2,004,354

UNITED STATES PATENT OFFICE 2,004,354

METHOD OF PREPARING APPLES FOR COLD PACKING

James S. Tierney, Upper Darby, Pa.

No Drawing. Application August 1, 1934, Serial No. 737,931

2 Claims. (Cl. 99—8)

This invention relates to a method of preparing apples for cold packing, and more particularly to the preparation of fresh apples for freezing in such manner as to retain the true flavor, color, texture, and firmness of the fruit.

Heretofore it has been proposed to treat apples in preparation for freezing with brine or a solution strongly impregnated with salt, and thus to prevent oxidization and change of color. As the result of such treatment, it frequently happens that the apples will retain a strong salty taste rather than the true fruit flavor which characterizes a fresh apple.

One of the principal objects of the present invention is to prepare apples for freezing in such manner as to prevent oxidization and discoloration, and at the same time to preserve the true flavor and the original firmness of the fruit.

Other more specific objects and advantages characteristic of my invention will become more apparent from the description hereinafter set forth of one example of the practice thereof.

According to the preferred method, the fresh apples are first pared and cored, and then immersed in a weak salt solution, say a 2% solution of salt in water. The apples are then inspected and specked, if necessary. After the apples are thus prepared, they are run through a slicing machine and conveyed to a treatment tank where the pieces are immersed into a solution of sugar, salt, lemon juice, and water. Desirably this solution may include 0.5% of sugar, 5% of salt, and 0.5% of lemon juice. After the sliced apples have remained in this bath for about 2½ minutes, they are removed from the treatment tank and drained into portable tanks containing a solution having similar ingredients but made up of a higher percentage of sugar and lemon juice and a reduced amount of salt. Desirably this solution may have 20% of sugar, 1½% of lemon juice and 1% of salt.

When the portable tanks are thus filled, they are loaded into a vacuum retort and subjected to a relatively high vacuum, say 28 inches, and there held for a period of 45 minutes or thereabouts. At the end of this period the vacuum is broken, and the atmosphere allowed to enter the retort. The portable tanks are then removed, and the apples are drained and packed with sugar into other containers. As soon as these containers are filled they are placed in a refrigerator. Desirably the temperature of the refrigerator is maintained at approximately zero degree Fahrenheit until the apple pieces are frozen solid. The temperature is then raised to about 17° F., and held at this point until the fruit is ready for use.

It will be noted that the weak salt solution into which the apples are originally placed when they come from the paring and coring machine is used for the purpose of preventing oxidization of the apples during the period of inspection and trimming, and while they are passing through the slicing machine. The first treatment tanks into which the apple pieces are initially dropped from the slicing machine contain a solution which is designed to prevent discoloration, to retain the firmness or natural texture, and to bring out the true apple flavor. In this solution the salt ingredient assists the sugar in preservation and retards oxidization, the sugar acts as a preservative, particularly preserving the original firmness of the fruit, and the lemon juice, containing citric acid, brings out the flavor. The final solution in the portable tanks into which the apple pieces are drained from the initial treatment tanks contains the same ingredients, but the quantities are changed, there being a greater amount of sugar and citric acid, and a lesser amount of salt. The placing of the apples in the vacuum retort extracts air from the apple pieces, while they are held by a screen or the like below the level of the solution. When the vacuum is broken, the voids, caused by extraction of the air, become filled with the solution by the pressure of the atmosphere thereon, and the apple pieces become completely saturated with the solution.

It will be particularly noted that for the final immersion, instead of employing a solution containing a high percentage of salt, the salt ingredient is negligible and only sufficient to prevent oxidization. Thus the sugar and citric acid serve, at this stage of the process, not only to preserve and bring out the flavor of the fruit, but, as I have found, these ingredients serve also to counteract the strong salty taste which many apples have when they have been immersed for a long period of time in a brine solution, or one in which the salt content is sufficiently high to saturate the solution.

In other words, it is characteristic of this invention that the several ingredients of the final solution used in the vacuum retort, in the combination herein described, function in their individual capacities to preserve the fruit in the desired condition, and additionally coact to maintain the original flavor of the fruit.

Having thus described my invention, I claim:

1. A method of preparing fresh apples for cold packing which includes the steps of immersing the apple pieces in a solution containing a major portion of sugar and citric acid and a minor portion of salt, and while so immersed subjecting the pieces to a vacuum, then breaking the vacuum, and packing and freezing the pieces.

2. A method of preparing fresh apples for cold packing which includes the steps of immersing the apple pieces in a solution of sugar, salt and citric acid, then immersing the pieces in a solution having a greater amount of sugar and citric acid and a lesser amount of salt, and while so immersed subjecting the pieces to a vacuum, then breaking the vacuum, and packing and freezing the pieces.

JAMES S. TIERNEY.